United States Patent
Heikkinen et al.

(10) Patent No.: US 9,068,832 B2
(45) Date of Patent: Jun. 30, 2015

(54) METHOD AND A DEVICE FOR DETERMINING A DIRECTION IN A MAGNETIC FIELD

(71) Applicant: SUUNTO OY, Vantaa (FI)

(72) Inventors: Aimo Heikkinen, Vantaa (FI); Mikko Martikka, Vantaa (FI); Erik Lindman, Vantaa (FI)

(73) Assignee: Suunto Oy, Helsinki (FI)

( * ) Notice: Subject to any disclaimer, the term of this patent is extended or adjusted under 35 U.S.C. 154(b) by 169 days.

(21) Appl. No.: 13/832,081

(22) Filed: Mar. 15, 2013

(65) Prior Publication Data

US 2014/0182148 A1 Jul. 3, 2014

Related U.S. Application Data

(60) Provisional application No. 61/747,390, filed on Dec. 31, 2012.

(30) Foreign Application Priority Data

Dec. 31, 2012 (FI) ..................................... 20126398

(51) Int. Cl.
*G01C 9/26* (2006.01)
*G01C 17/38* (2006.01)
*G01C 19/04* (2006.01)
*G01C 17/28* (2006.01)
*G01C 17/04* (2006.01)
(Continued)

(52) U.S. Cl.
CPC ............... *G01C 17/28* (2013.01); *G01C 17/38* (2013.01); *G01C 17/04* (2013.01); *G01C 17/30* (2013.01); *G01C 17/00* (2013.01)

(58) Field of Classification Search
CPC ........ G01C 17/00; G01C 17/38; G01C 17/04; G01C 17/30; G01C 17/28
USPC ..................................................... 33/355, 356
See application file for complete search history.

(56) References Cited

U.S. PATENT DOCUMENTS

| | | | |
|---|---|---|---|
| 6,356,851 B1 | 3/2002 | Young et al. | |
| 6,643,941 B2 * | 11/2003 | Parks et al. | ..................... 33/356 |
| 6,817,106 B2 | 11/2004 | Kato | |

(Continued)

FOREIGN PATENT DOCUMENTS

| | | |
|---|---|---|
| EP | 1832889 A2 | 9/2007 |
| FI | 120276 B | 8/2009 |

(Continued)

*Primary Examiner* — Laura Martin
*Assistant Examiner* — Rhyan C Lange
(74) *Attorney, Agent, or Firm* — Terence P. O'Brien; Seppo Laine Oy

(57) ABSTRACT

A method and an electronic device for determining the direction of a magnetic field, in which a mobile electronic compass device is used to measure three field vectors of the magnetic field the desired number of times. From each measurement, a data point (p1-p6) is formed in a three-dimensional co-ordinate system, for which measured data points a common reference point (C) is calculated. The location of the device is determined relative to the reference point in said co-ordinate system and the co-ordinates of the reference point obtained are compared to the co-ordinates of at least one previous reference point, and the co-ordinate values of the reference point are calibrated, after which the direction of the magnetic field is indicated with the aid of the reference point.

19 Claims, 3 Drawing Sheets

(51) Int. Cl.
*G01C 17/30* (2006.01)
*G01C 17/00* (2006.01)

(56) References Cited

U.S. PATENT DOCUMENTS

| | | | |
|---|---|---|---|
| 6,968,273 B2 * | 11/2005 | Ockerse et al. | 701/530 |
| 7,177,779 B2 * | 2/2007 | Hikida et al. | 702/150 |
| 7,865,323 B2 * | 1/2011 | Hirobe et al. | 702/92 |
| 8,239,153 B2 | 8/2012 | Piemonte et al. | |
| 2002/0035791 A1 | 3/2002 | Parks et al. | |
| 2006/0066295 A1 | 3/2006 | Tamura et al. | |
| 2007/0276625 A1 | 11/2007 | Hikida et al. | |
| 2008/0289203 A1 * | 11/2008 | Martikka et al. | 33/356 |
| 2010/0161272 A1 | 6/2010 | Yamashita et al. | |
| 2010/0312509 A1 | 12/2010 | Patel et al. | |
| 2011/0015895 A1 | 1/2011 | Handa et al. | |
| 2011/0231144 A1 * | 9/2011 | Kitamura et al. | 702/141 |
| 2011/0248704 A1 * | 10/2011 | Chowdhary et al. | 324/202 |

FOREIGN PATENT DOCUMENTS

| | | |
|---|---|---|
| JP | 2007139715 A | 6/2007 |
| WO | WO 2012111413 A1 * | 8/2012 |

* cited by examiner

METHOD AND A DEVICE FOR DETERMINING A DIRECTION IN A MAGNETIC FIELD

FIELD OF INVENTION

The invention relates to an electronic device and method for determining direction in a magnetic field, in which electromagnetic sensor means are used to measure the field components in the magnetic field, with the aid of which the direction of the magnetic field is measured and indicated and the calibration of the device is performed. The device particularly relates to a compass device, such as a wristop computer, but is also equally suitable for use in fixed installations, such as in vehicles.

BACKGROUND OF THE INVENTION

Electronic compasses are used for showing direction, for example, in cars and in wristop computers. In such compasses, there are typically two or three magnetic-field sensors perpendicular to each other, detecting the components of the magnetic field. Such arrangements are disclosed in, for example, U.S. Pat. No. 6,817,106 and US application publication 2010/0312509.

Naturally, the sensors are sensitive to not only the magnetic field of the Earth, but also to other external magnetic fields and to magnetic fields originating from the device itself. Magnetizing substances in the vicinity of the device will also deform external magnetic fields, which can also cause distortion in the compass reading. Due to such interference, an accurate reading requires the compass to be calibrated before the actual determining of direction. Correction usually takes place by calibration made by the user. Some wristop computers are also known, in which calibration is performed by the user first who sets the device in a calibration state, and then turns around 360 degrees holding the device in the hand. The centre point of a magnetic circle is defined from the data collected during this rotation and is used to calculate the compass direction based on new measurements when the device is in a compass state. Problems with this method are that calibration is slow and difficult and that if the calibration is not done often enough, the device's direction reading may not necessarily be reliable.

Calibration is thus mainly intended to eliminate the effect of static interference factors arising from the operating environment from direction determination. However, in actual direction determination, the measurement noise causes a problem which is mainly due to the tilting of the magnetic sensors away from the horizontal plane. The signal they transmit will then not correspond to the real compass direction, but methods to take this noise into account are required. US publications U.S. Pat. Nos. 6,356,851, 8,239,153, and 2002/0035791 describe the problem field relating to the calibration of electronic compasses and disclose some methods for performing the actual calibration in compasses.

The method disclosed in U.S. Pat. No. 6,356,851 is based on seeking minimum and maximum sensor readings. The device is moved in such a way that measurement data is obtained from all the quarters of a circle corresponding to different bearings. This kind of calibration is poorly suited for example for trekking use and in wristop devices, and also requires a very pure signal if it is to operate reliably.

The method disclosed in US publication 2002/0035791 is based on measuring three x,y point pairs corresponding to different positions of the device and solving a circle equation on the basis of the measurements. One drawback of the method is that the device requires a considerable amount of rotation in order to make a successful calibration. In addition, the method is relatively demanding mathematically, i.e. it consumes much power. Because of the aforementioned reasons, the response times also become unnecessarily long.

U.S. Pat. No. 8,239,153 discloses an auto-calibration method, which continuously monitors changes taking place in the magnetic field of the environment, and calculates when re-calibration is needed. The actual calibration event is not an issue here. This approach too has the downside of high power consumption.

FI patent 120276 discloses a compass device, in which, when the compass is used, it is calibrated continuously when the measured data is of a sufficiently high quality for performing the calibration. In this device, there is no need for a separate calibration state; instead calibration takes place in the direction-display state when the compass is used, if the predefined quality criteria for the compass signal are met.

Most of the known devices are however restricted to measuring magnetic fields in a plane, i.e. in a 2D state. The quality of 2D-calibration is highly dependent on local conditions, because the farther from the equator that one is, the greater is the vertical component of the magnetic field and the detrimental noise produced by it, and the more easily tilting of the compass will produce an error requiring compensation. The accuracy of the sensors, the user's movements, and the calculation methods used also affect the need for and the result of calibration. Calibration typically requires intensive calculation and/or the user to repeat the calibration several times, before achieving acceptable accuracy.

One way of calculating the offset vector of a magnetic field is disclosed in U.S. Pat. No. 7,177,779, in which calculation is performed in three dimensions (3D). In this case, both the offset vector and the radius of the magnetic circle are determined, thus using methods requiring intensive calculation, such as matrix calculation and statistical algorithms, and a large number of checks must be made of the correctness of the estimates of the compass direction.

SUMMARY OF THE INVENTION

The invention is intended to create a method and a device for displaying a direction, with automatic calibration that is unobtrusive and reliable to the user, with low power consumption and which does not demand a great deal of continuous calculating power. In particular, the intention is to create a new wristop computer, yachting computer, or vehicle computer comprising a compass, the intended purpose of which will cause it to be used in very varying operating conditions.

The invention is based on the idea that, when the compass is used, it is calibrated continuously, depending on whether the measured data is of a sufficiently high quality for calibration to be performed. Thus, in the method according to the invention, in order to determine the compass direction with the electronic compass device, the user is not requested to make a separate calibration, other than in exceptional cases. In this way, calibration normally takes place in the direction-display state, i.e. 'on the fly', when the device is being used, if the specific compass-signal quality criteria are met. In a normal situation, when the user starts the compass device, the calibration that is ready in the compass is good enough for the compass to be used immediately. The device itself performs calibration continuously in the background, so that the direction shown by the compass will be accurate. In addition, calibration is always performed when the battery is changed and at regular intervals, all of which is performed in the background without the user noticing.

Calibration in the background can be done, for example, at weekly intervals, to the performance of which it is preferable to link other criteria too. Acceleration sensors can be used to monitor the movements of the device and seek a suitable time for calibration from that. The time of day and/or a calendar can be used to decide if it is daytime and the weekend, whereby the movement can be associated with leisure activities and travel, in which case the need to use, and thus for calibration, of the compass is more likely. After a power-saving state or after being switched off, a check can be made as to how much time has passed since the previous calibration and the state of movement.

If good calibration cannot be obtained in the background, the user is requested to perform the calibration, in which case the method according to the invention makes it possible to perform calibration by means of a relatively arbitrary rotation of the device, so that it can be easily and quickly carried out. Or, if calibration should not be performed within a set time (time out), the attempt may be dropped to save power. In that case, calibration by the user can be resorted to, when he switches the compass on.

Considerable advantages are achieved with the aid of the invention. This is because with the aid of the invention calibration can be hidden from the user as an unobtrusive background operation, which is performed at the same time as the user operates the compass in a normal direction-display state.

The calibration measurement is repeated only when required, if excessive variation is detected in the magnetic field, or if earlier reliable calibration data is not available (for example, initiating the compass state for the first time in a long while). This permits giving the calibration task to low-power processors, in a streamlined manner using the aiming method according to the invention and to be described later, with no need for intensive statistical calculation in the background. In fact, if there are no erroneous measurements in the measurement data, and the measurements are orthogonal (the magnetic sensors are calibrated to be orthogonal at the factory by using sensitivity matrices), a single three-plane aiming will be sufficient. Particularly multi-purpose wristop devices have small processors, easily leading to long response times if the processor has many simultaneous tasks, for example, handling remote-sensor radio traffic and performing various calculations, such as decompression algorithms in diving, training responses in exercise sessions, or caloric consumption.

BRIEF DESCRIPTION OF THE DRAWINGS

In the following, embodiments of the invention are examined in greater detail with reference to the accompanying drawings, in which.

DETAILED DESCRIPTION OF EXEMPLARY EMBODIMENTS

Figure 1:
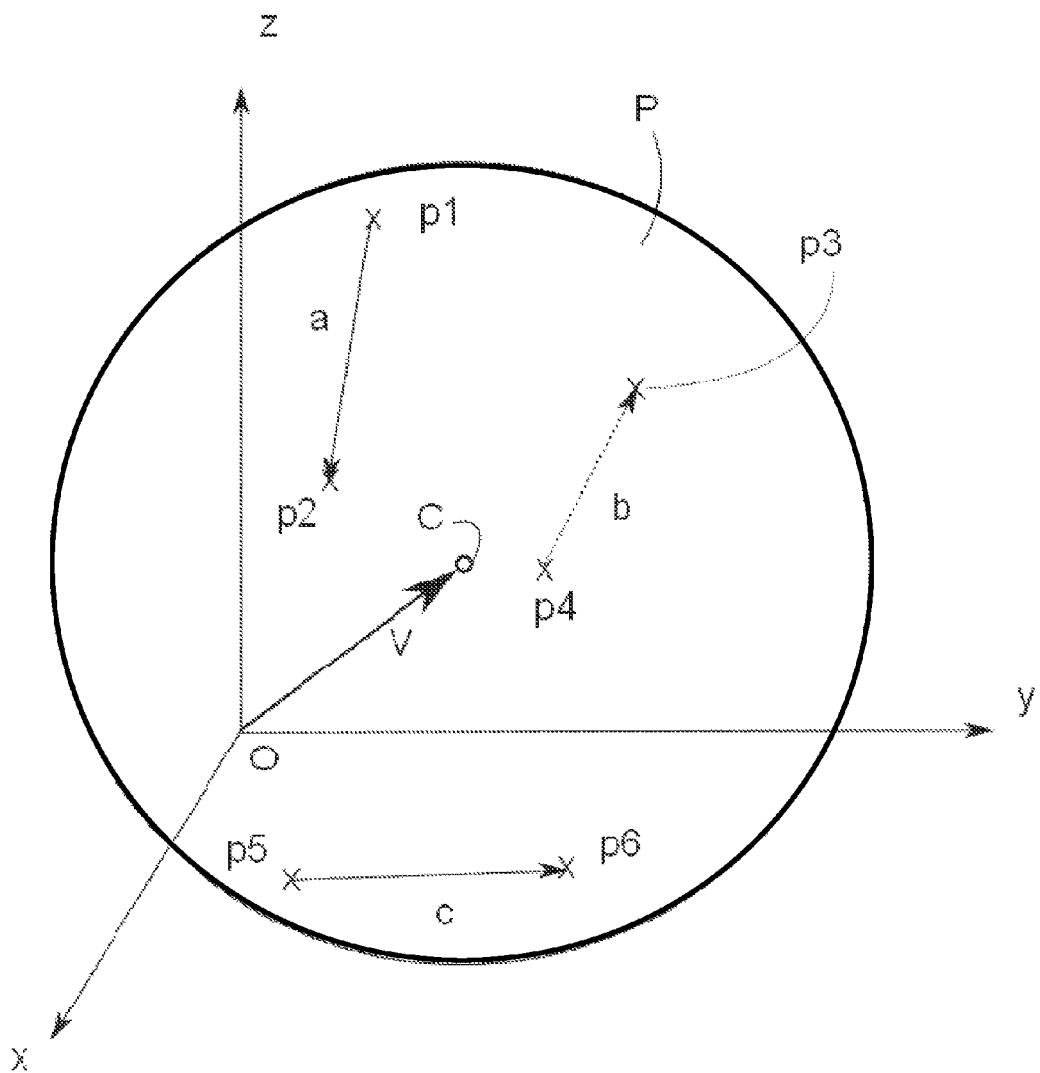
FIG. 1 shows the 3D calibration of a compass in the arrangement according to the invention.

FIG. 1 shows the measurement geometry of the calibration of a device according to the invention. The device's magnetic sensors, which are fixed in the device, are thus able to show the direction of magnetic north in three dimensions with a specific accuracy. In FIG. 1, this space is depicted by a co-ordinate system xyz and its origin O being the centre point of the measurement space of the magnetic sensors, e.g. the point of intersection of the measurement directions of the sensors (FIG. 2), and thus also the physical centre point of the device's compass. However, the device has various components, such as metal structures, loudspeakers, etc., which cause interference and noise. In fixed installation devices there are corresponding factors also in the environment. The centre point of the measurement space of the magnetic sensors is therefore never O, but instead a point C at the end of the vector V. The location of the point C is not constant, though the noise in the vector V arising from the internal properties of the device can be measured and permanently calibrated out. The changing environment and the objects in it, as well as changes in the Earth's magnetic field and its declination at longer distances also affect the error. Vector V is referred to as the offset vector. The offset vector V is determined when required by measuring the interference arising from the device and the magnetic field of its environment, and creating a new offset vector V at the reference point C from the device's centre point O.

The following is a more detailed review of various sources of error of magnetic-sensor measurements and their compensation in the manufacturing stage and possibly in reinstallation and other similar situations with a compass device, which involve change in the permanent conditions of the magnetic sensors.

Declination

Declination, i.e. deviation, is a location-dependent error and refers to the angle between the directions of geographic north and magnetic north, which are thus not parallel. The compass can be calibrated either manually, for example based on deviation information printed on a map, or with the aid of a GPS device, in which the information in question has been stored beforehand. After calibration, the compass will point towards the geographic north.

Tilts

The direction shown by a compass is affected by the angle at which the compass is held. The surface of the Earth can be understood as a set of xy-co-ordinates, in which the x direction is towards the horizon and the y direction is perpendicular to the sides. It will then be necessary to compensate for the compass's inclination angle (elevation) relative to the horizon and the compass's inclination (bank angle) relative to the y axis. In the angle measurements of the sensors, an IMU (Inertial Measurement Unit) measuring device is usually used, in which there are at least two sensors: an acceleration sensor and a magnetometer. It can also include a gyroscope, though these cannot be miniaturized to any great extent, for which reason they are not used in micromechanical so-called MEMS devices. The tilts are calculated using acceleration sensors, which measure the device's acceleration in three dimensions. The X-direction acceleration and the Earth's gravity (z direction downwards) give the elevation angle and correspondingly the y and z values the bank angle. Calibration relative to tilt takes place, of course, while the compass device is being used, but tilt correction tables for the values of the magnetic field must be stored in the device's so-called sensitivity matrix.

The north direction shown by a magnetic compass is also affected by a deviation caused by metals in the vicinity of the compass. These are of two types. Those (Hard Iron) causing a constant-magnitude field create a permanent offset in the location of the Earth's magnetic field detected by a magnetometer. Typical examples are the magnets of loudspeakers. If the Earth's magnetic field detected by a magnetometer is considered as a circle, when rotating it 360° in the horizontal plane, the deviation will appear as a shift in the centre point of the circle. Such deviation is relatively easy to compensate for in the calibration of a compass device, because the strength and direction of its magnetic field are generally constant.

A second cause of deviation are various metals, such as nickel and iron near the magnetometer, which distort the shape of a magnetic field passing through them, without being magnetic themselves (Soft Iron). These are more complicated to compensate for, because the deviation depends on the orientation of the material relative to the sensor and the magnetic field that it detects. The result of the distortion is usually that the circle of the field strength detected by the magnetometer becomes a tilted ellipse. Compensation takes place by first of all correcting the field of the magnetometer relative to the declination and any fixed magnetic fields. After that, the ellipse's longest and shortest vectors are measured from the centre point, from which the axes of the ellipse are obtained, and by resolving this for the tilt of the ellipse. Once the tilt angle is known, the attitude of the ellipse can be corrected to be horizontal. The shape of the ellipse can be corrected to a circle e.g. by dividing the co-ordinate values of the circumference of the ellipse by the ratio of its axes, i.e. by a scaling constant. By rotating the circle thus obtained back by the amount of the tilt angle of the ellipse, a corrected circle is obtained, which will act as a device-specific basic calibration, and as a basis for calibrations to be carried out later. If necessary, the corrections can also be made to the ellipsoid, in which case the three field-strength vectors of the magnetic measurement sensor can be scaled for the three magnetic sensors in the magnetometer and stored in the sensitivity matrix of the device.

Thus, the distortions in measurement caused by the device itself and its magnetic sensors are entered in a memory 10 of the compass device 1 of the present invention. The correction of the direction of geographical north i.e. the declination is possibly also recorded. This 'table' of correction parameters is referred to as the sensitivity matrix of the device. The amplification and cross-sensitivity data of the magnetic sensors 3a-3c of the compass device 1 is generally determined already at the factory and are stored in the sensitivity matrix, so that when describing the operation of the invention they are assumed to be known, and it is assumed that at least the cross-sensitivity factors will not change substantially during the operation of the device. Thus, the distortions relating to the location of each measured point p1-p6 have already been eliminated. Alternatively, at the factory only the magnetic sensors together with the application-specific ASIC (ASIC=Application Specific Integrated Circuit) circuits are calibrated, whereby the readily calibrated compass sensor is a product that can be installed in any desired device casing.

In fixed installations, calibration takes place by taking into account the entire vehicle, vessel, or device that moves along with the compass device. If the compass is moved to another location in the vehicle, etc., the user can himself naturally set the compass device into the calibration state, so that the new position will be immediately taken into account in the calibration.

Calibration

In the device according to the invention there are sensors, by means of which the magnetic field can be measured in three different directions. The sensors can be in the same component casing or separate from each other. In an optimal situation, the sensors form a rectangular co-ordinate system and their amplification factors are identical. This means that, if the device is turned in such a way that one sensor points exactly in the direction of a magnetic field, this sensor will then give a reading M, which corresponds to the strength |M| of the magnetic field M. The two other sensors of the set of co-ordinates give the reading 0. Correspondingly, if the device is carried in such a way that the second sensor points exactly in the direction of the magnetic field, this second sensor gives the reading M and the first and third sensors the reading 0. The same is true of the third sensor. In reality this is not the case, instead the trio of sensors must be tuned to display correctly. Tuning produces a so-called sensitivity matrix and a deviation vector V=[x,y,z]. If random sensor readings are examined in a three-dimensional co-ordinate system, they will form an ellipsoid. This ellipsoid can be converted to a spherical surface by using the correction factors contained in the sensitivity matrix. The centre point of the spherical surface formed by the measurement results thus obtained is located in the position indicated by the deviation vector V in the measurement space (FIG. 1).

In the compass device according to the invention, it is assumed that the sensitivity matrix will remain unchanged throughout the device's operating history. On the other hand, the deviation vector V of the measurement changes almost continuously. This can be due, for example, to the components of the device becoming magnetized in a strong external magnetic field. These magnetized components will cause a systematic error in the readings of the sensors. The deviation vector should therefore be determined before the measurement results can be used in determining the position (compass direction) of the device. In the present invention, this determining of the deviation vector is referred to as calibration and the present invention discloses methods, by means of which calibration can be performed by calculation economically and without disturbing the user.

Using calculation to determine a change in the deviation vector is often laborious and should be done often, because the deviation also changes frequently. This also means that the deviation vector should be determined often. This makes it 'unnecessary' to ascertain the occurrence of changes in the deviation vector. In the present invention, this is therefore bypassed and the deviation is determined each time the compass is used.

If the magnetic field to be measured is M=[Mxi,Myi,Mzi], and the readings of the sensors are corrected using the sensitivity matrix, the measurement results are obtained $$pxi = Mxi + x$$

$$pyi = Myi + y \qquad (1)$$

$$pzi = Mzi + z$$

Above, i depicts different measurement moments and its values are typically i=1,2, . . . , 6. The term measurement point refers to the readings pxi, pyi, and pzi at a single measurement moment. The components Mxi, Myi, and Mzi are the values of the Earth's magnetic field in the directions of the sensors and change when the device is rotated into different attitudes relative to the magnetic field. Three vectors are formed from the measurement points. This can be done using three measurement points, the maximum number of measurement points required being six, as shown in FIG. 1.

The deviation vector of the magnetic field can be determined e.g. by using the so-called aiming method. It is assumed that the sensitivity matrix produces a spherical surface from the measurement results. FIG. 1 shows six points p1-p6 on this spherical surface, which in pairs (p1,p2; p3,p4;

and p5,p6) form three vectors a, b, and c. Their centre points are $$pa=(p1+p2)/2$$

$$pb=(p3+p4)/2 \qquad (2)$$

$$pc=(p5+p6)/2$$

and the unit vectors $$na=(p2-p1)/|p2-p1|$$

$$nb=(p4-p3)/|p4-p3| \qquad (3)$$

$$nc=(p6-p5)/|p6-p5|$$

The centre point and unit vector of each vector, for example pa and na, define a plane passing through the bisector of the vector. na is the normal vector of the plane in question, i.e. it is perpendicular to the plane. In the case of the spherical surface, the radius of the sphere is on this plane. Consequently, the intersection point of the planes formed above also defines the centre point of the sphere (the 'reference point'). The intersection point of the planes is obtained using the equation $$V=inv(|na\ nb\ nc|)[(pa*na)(nb \times nc)+(pb*nb)(nc \times na)+(pc*nc)(na \times nb), \qquad (4)$$

in which inv(|na nb nc|) is the inverse determinant of the three-row matrix formed by the vertical vectors na, nb and nc. pa*na is the scalar product of the vectors pa and na; nb×nc is the cross product of the vectors nb and nc, and so on. If two planes are parallel, or if all the normal vectors are in the same plane, then |na nb nc|=0, and the definition is not possible.

Alternatively, the deviation vector V=[x, y, z] (the centre point C of the sphere P, the 'reference point') can be determined by solving the groups of equations satisfied by the measurement points p1-p6 of the sphere P of FIG. 1

$$(p1x-x)^2+(p1y-y)^2+(p1z-z)^2=(p2x-x)^2+(p2y-y)^2+(p2z-z)^2$$

$$(p3x-x)^2+(p3y-y)^2+(p3z-z)^2=(p4x-x)^2+(p4y-y)^2+(p4z-z)^2 \qquad (5)$$

$$(p5x-x)^2+(p5y-y)^2+(p5z-z)^2=(p6x-x)^2+(p6y-y)^2+(p6z-z)^2$$

In the group of equations shown above, it should be noted that the second-order factors of the variables x, y, and z being sought will cancel out.

EXAMPLE

Shown below is the calculation of the symmetry point of a magnetic measurement performed using the aiming method with the Matlab™-code, using the method of the equations (2)-(4). In the example, it is assumed that the sensors are fully orthogonal and the measurements are free of noise. Advantages of the methods according to the invention are that the radius of the sphere need not be known beforehand even as an estimate, and that the calculation works well also with integers.

```
function intersection = calc(origo)
%
% Verification code for the 'aim-with-planes' method using ideal
data.
% Ideal means that measurements are from orthogonal axes and there
is no
% noise involved.
% - 'origo' is the reference point to be determined.
% - 'intersection' should be the same than 'origo' after calculation.
%
%[
Get segment midpoints (xp) and segment unit vectors (n).
%]
[n,xp] = simulateMeasurements(origo);
%[
Calculate the inverse of the normal matrix determinant
%]
detN = n(1,1) * ( n(2,2) * n(3,3) − n(3,2) * n(2,3) ) ...
    − n(2,1) * ( n(1,2) * n(3,3) − n(3,2) * n(1,3) ) ...
    + n(3,1) * ( n(1,2) * n(2,3) − n(2,2) * n(1,3) );
inv_detN = 1 / fetN;
%[
Calculate the intersection of the three planes defined by the
measurement
points. Three points is the minimum, siz is the maximum to construct
three
segments on the sphere.
%]
c1 = dotProduct(xp(1,:),n(1,:)) * crossProduct(n(2,:),n(3,:));
c2 = dotProduct(xp(2,:),n(2,:)) * crossProduct(n(3,:),n(1,:));
c3 = dotProduct(xp(3,:),n(3,:)) * crossProduct(n(1,:),n(2,:));
intersection = inv_detN * (c1 + c2 + c3);
function sp = dotProduct(vec1,vec2)
%
%
%
sp = vec1(1) * vec2(1) + vec1(2) * vec2(2) + vec1(3) * vec2(3);
function cpVec = crossProduct(vec1,vec2)
%
%
%
cpVec(1) = vec1(2) * vec2(3) − vec2(2) * vec1(3);
cpVec(2) = −vec1(1) * vec2(3) + vec2(1) * vec1(3);
cpVec(3) = vec1(1) * vec2(2) − vec2(1) * vec1(2);
function [segment_unit_vectors,segment_midpoints] =
simulateMeasurements (origo)
%
%
%
%[
Initialize variables to zeros
%]
segment_end_points = zeros(4,3);
segment_unit_vectors = zeros(3,3); % unit vectors of segments
segment_midpoints = zeros(3,3); % midpoints
R = 3000*rand + 100; % Arbitrary radius for simulations, will be
different at every call
%[
Create arbitrary end points of segments
%]
for i=1:4,
    x=rand;
    y=rand;
    z=rand;
    p = sqrt(x^2+y^2+z^2);
    segment_end_points(i,:)=R*[x y z]/p + origo;
end
%[
Create unit vectors and midpoints
%]
for i = 1:3,
    v = segment_end_points(i,:) − segment_end_points(i+1,:);
    segment_unit_vectors(i,:) = v / norm(v);
    segment_midpoints(i,:) = ( segment_end_points(i,:) +
segment_end_points(i+1,:) ) / 2;
end
```

Real measurements always have random errors ('measurement noise'). The reliability of the calculation is improved if the angle between the line segments defined by the measurement results is large, for example 37 degrees or more. Even a smaller movement of the device will suffice, if the quality of the position information of the measurement points can be checked as described later. It has been observed that, if the noise level is less than 2%, the determination of the deviation vector will succeed with a change in direction of two degrees or even less. In such a case, the accuracy of the compass direction will remain better than two degrees.

Error Checking

The quality of the calibration will improve, if the measurement points are chosen suitably. The selection criteria depend on the desired accuracy, the properties of the compass device, and of the calculation methods chosen. The checks described in the following are therefor only examples:

- checking the minimum and maximum values of the co-ordinates of the measurement points p1-p6. It is obvious, that acceptance limits can be set for values remaining outside or inside the envelope of the sphere P. For example, it can be stipulated that the distance of all the points from the calculated centre point should be within an error margin of 5%;
- the distance of the measurement points from each other must be at least in the order of the sphere P's radius/3, i.e. they must not be too close to each other. In addition, the processing circuit 12 can be arranged to calculate the segments always between the consecutive measurement points, so that the segments are likely not to cross;
- the angle of the vectors a, b, and c relative to each other should be more than 37 degrees, which will ensure that the vectors are not parallel and that the determination of the centre point is not overly sensitive to errors produced by noise as to the direction of the segments;
- the volume of the parallelepiped delineated by the vectors should be greater than half of the product of the lengths of the vectors a, b, and c, i.e. $|(a \times b) \cdot c| > |a||b||c|/2$, which will ensure that the vectors are not in the same plane;
- the difference of the reference point C from the previous reference point should be less than the sphere P's radius/20. This ensures accuracy, while in the same calibration it can be required that two consecutive reference points should be obtained with the said accuracy, to prevent erroneous calibrations;
- the value of the co-ordinates of the reference points C is set to be the mean value of the co-ordinates of the last two acceptably calculated points C;
- the oldest two measurement points, i.e. the oldest vector, are always deleted when the calibration is renewed.

Compass Direction

Figure 2:
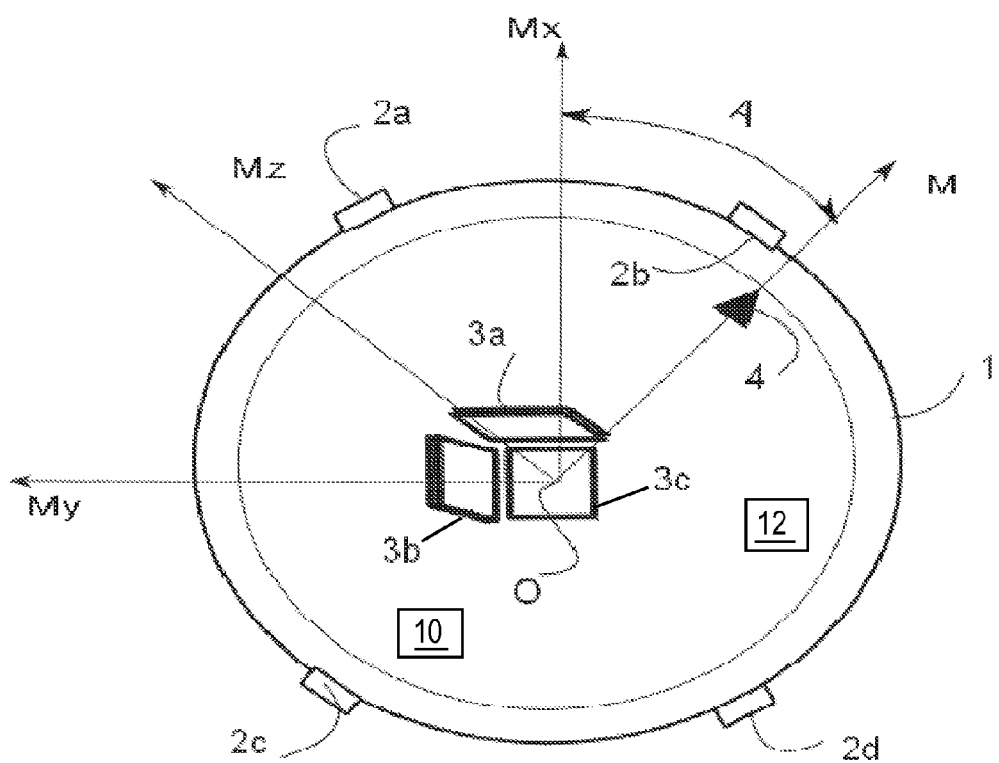
FIG. 2 shows schematically a compass device according to the invention.

FIG. 2 shows schematically a compass device 1 according to the invention, which in this example is a wristop computer. The figure also shows the buttons 2a-2d controlling the functions of the device. Inside the device are magnetic sensors 3a-3c, which measure the Earth's magnetic field orthogonally. In FIG. 2, the sensors are located in the middle of the device, their location being generally chosen according to the device's electrical properties. The symbols Mx, My, and Mz are used to depict the components of the Earth's magnetic field parallel to the sensors. The term compass direction generally refers to the direction of some reference axis of a horizontal projection relative to a horizontal projection of the Earth's magnetic field. Generally in wristop computers the reference axis is regarded as the 'twelve o'clock' direction. In FIG. 2, the component Mx corresponds to this direction. A wristop computer is typically not held horizontally; instead its tilt must be determined prior to defining the compass direction. A wristop computer can be equipped with, for example, acceleration sensors, with the aid of which the tilt is determined relative to at least two independent directions. Two readings depicting the tilt are then obtained, tilt_x and tilt_y. With the aid of the magnetic measurements and the tilt data the horizontal projections of the measurements are defined:

[Mx, My, Mz, tilt_x, tilt_y]→[Mx_h, My_h, Mz_h, 0, 0].

With their aid, the aiming direction in the magnetic field is calculated:

$D = a \tan 2(My\_h, Mx\_h)$.

Tilt compensation can be made mathematically in several ways, which are not described here. Mx_h, My_h, and Mz_h are the components of the horizontal projection of the measurement.

The direction D calculated by the compass device can be shown as such to the user in the display of the compass device, for example by means of an arrow 4. In addition, a target direction A can be displayed. In the device of FIG. 2, the x-direction ('Mx') of the set of co-ordinates of the magnetic field has been selected to be the indication of the direction of travel. Of course, the indication of direction of travel can also be some other direction. When calculating compass direction, the symmetry point 'O' of the device according to FIG. 2 acts as the 'location' of the entire device.

Figure 3:
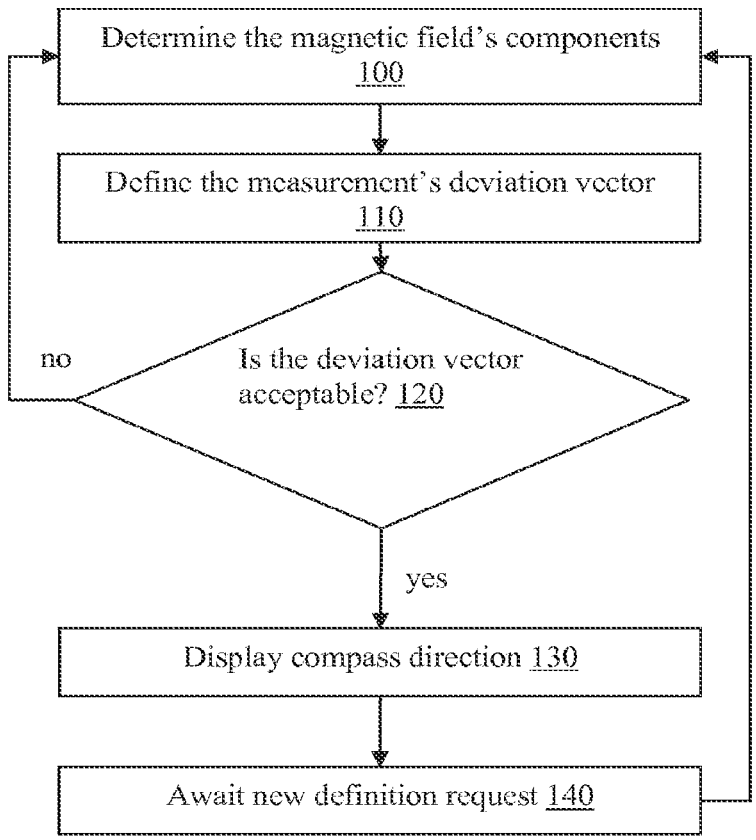
FIG. 3 shows a flow diagram of the operation of a compass device according to the invention.

The flow diagram of FIG. 3 shows the operation of one embodiment of the method according to the invention. In stage 100, the measurement point pi is defined. In stage 110, the deviation vector (the reference point, i.e. the centre point C of the sphere P) of the measurement is calculated. Definition of the deviation vector requires several measurement points, typically points p1-p6. Definition of the deviation vector will fail if there are not enough points, or if the definition is erroneous, see error checking. In practice, stages 100-120 are repeated until the consecutive definitions of the reference point C are sufficiently similar. Next, the compass direction 130 is displayed. The algorithm according to FIG. 3 is repeated again either after a specific interval of time or after some predefined event. Such an event can be, for example, a change greater than a preset value in the measurement values of the sensors.

The invention is not restricted to the embodiments described above, but is to be interpreted within the full extent of the accompanying claims.

The invention claimed is:

1. A method for determining the direction of a magnetic field, the method comprising:
    measuring with a portable electronic compass device three field vectors of a magnetic field a desired number of times,
    forming from each measurement a data point in a three-dimensional co-ordinate system,
    calculating a common reference point for the measured data points,
    determining the location of the device relative to the reference point in the co-ordinate system,
    comparing the co-ordinates of the reference point obtained to the co-ordinates of at least one previous reference point,
    calibrating the co-ordinate values of the reference point, and
    indicating the direction of the magnetic field with the aid of the reference point,
    wherein the data points are formed on an essentially spherical surface and the calculated reference point is the centre point of the sphere, and wherein the reference point is calculated by forming three line segments between selected data points, from which unit vectors are formed for three planes passing through the centre points of the segments, the intersection point of the planes being the reference point.

2. A method according to claim 1, wherein at least three data points are measured for the definition of each reference point.

3. A method according to claim 2, wherein six data points are measured for the definition of each reference point.

4. A method according to claim 1, wherein the reference point is calculated by forming a system of equations from the co-ordinates of selected data points, in which the equations of the sphere formed from the co-ordinates of each data point are set to be equal in pairs, from which system of equations the co-ordinates of the the reference point are solved.

5. A method according to claim 1, wherein the location of the device relative to the calculated reference point is at the end of a predefined offset vector.

6. A method according to claim 1, wherein the location of the device relative to the calculated reference point is obtained by measuring the interference caused to the magnetic field by the device and its environment, and forming therefrom an offset vector from the device to the the reference point.

7. A method according to claim 1, wherein two consecutive reference points are calculated and their co-ordinate values are compared, the mean value of the co-ordinate values being used as the actual reference point.

8. A method according to claim 1, wherein a specific number of reference points are calculated and the co-ordinates are analysed statistically, whereby the reference point with the minimum error in the statistical error function is used as the actual reference point.

9. A method according to claim 1, wherein a new reference point is always calculated when the power of the electronic compass device has been switched off.

10. A method according to claim 1, wherein a new reference point is calculated automatically, and upon failure, the user of the device is notified of the need for a manually performed calibration.

11. An electronic device for determining the direction of a magnetic field, comprising:
at least one electromagnetic sensor configured to produce signals representing measurements of at least three field components of the magnetic field, and the direction of the magnetic field;
a memory; and
a processing unit operably coupled to the memory and to the at least one sensor, the processing unit adapted:
to form from each measurement a data point in a three-dimensional co-ordinate system,
to calculate a common reference point for a number of data points produced by several measurements,
to compare the co-ordinates of the calculated reference point with the value of the co-ordinates of at least one previous reference point,
to calibrate on the basis of the comparison the location of the device relative to the reference point in the co-ordinate system, and
to produce an indication of the direction of the magnetic field relative to the device with the aid of the reference point, wherein the data points are arranged to be formed on an essentially spherical surface, whereby the common reference point obtained by calculation is the centre point of the sphere, the processing unit being adapted to calculate the reference point by forming three line segments between selected data points, from which unit vectors are formed to three planes passing through the centre points of the segments, whereby the intersection point of the planes is the reference point.

12. A device according to claim 11, wherein the processing unit is adapted to calculate the reference point by forming a system of equations from the co-ordinates of the selected data points, in which the equations of the sphere formed from the co-ordinates of each data point are set to be equal in pairs, from which system of equations the co-ordinates of the reference point are solved.

13. A device according to claim 11, wherein the means for detecting the direction of the magnetic field comprise three magnetic sensors measuring the magnetic field perpendicularly to each other.

14. A device according to claim 11, wherein a predefined offset vector is stored beforehand, that when added to the reference point indicates the location of the intersection point of the measurement directions of the magnetic sensors, which is the location of the device.

15. A device according to claim 11, wherein the location of the device relative to a calculated reference point is determined by measuring the interference caused to the magnetic field by the device and its environment, and forming therefrom an offset vector from the device to the reference point.

16. A device according to claim 11, wherein the processing unit is adapted to calculate a new reference point every time that the power of the electronic compass device is switched off.

17. A device according to claim 11, in which the processing unit is arranged to calculate a new reference point at specific predefined intervals.

18. A device according to claim 11, in which the processing unit is arranged to calculate a new reference point automatically, and upon failure to notify the user of the device of the need for a manually performed calibration.

19. A device according to claim 11, wherein the device is a wristop device such as a wristop computer for sports or trekking use.

* * * * *